Patented June 1, 1926.

1,586,893

UNITED STATES PATENT OFFICE.

AUGUSTE GAY, OF SAN FRANCISCO, AND JAMES W. BOOTH, OF PIEDMONT, CALIFORNIA, ASSIGNORS OF ONE-HALF TO FRANCIS D. COLLINS, OF SAN FRANCISCO, CALIFORNIA.

FOOD PRODUCT.

No Drawing.   Application filed October 3, 1924. Serial No. 741,475.

This invention relates to a new method of preserving food products for an indefinite period of time without subjecting them to high temperatures such as are necessary when such materials are boiled or cooked and without the addition of chemical preservatives of any kind.

A further object of the invention is to produce a stable preserved food without the addition of adulterants or foreign substances of any kind.

A further object of the invention is to enable food materials to be preserved for an indefinite length of time in a raw and uncooked state, thereby retaining practically intact the original chemical and nutritive properties of said materials as well as the vitamines contained in the original food material, which vitamines are not destroyed but which remain in the food product and act with undiminished force.

In practicing this invention the food materials are first dried or dehydrated in accordance with common methods which consist in the dehydration being carried to a moisture content of not greater than 25% and of course the temperature used is not higher than about 180 degrees.

The food materials herein referred to are first cut up in a chopping machine having revolving knives that break down the tougher fibres; the materials then are subjected to a minute grinding action. The object of this grinding is to produce a compact mass, uniform in color, in which the minute form of the fibres, seeds and cells will not interfere with the sale or use of the product. During this grinding the natural oils and natural fats, as well as the natural sugar fluids, cellulose, starches and mineral salts are thoroughly mixed together.

The nutritive properties contained in the skins, protective tissues, or pericarp of the fruit are thus equally distributed in the entire mass and there is also an equal distribution of the vitamines.

After having been once ground the mass is allowed to stand for a short time and is then subjected to another grinding, the object of which is to bring the food material to a nonporous form and to thoroughly and evenly distribute all juices, sugars, starches, oils, fat, cellulose and vitamines principles throughout the mass.

After having been again ground and after being exposed to the air a short time the food materials are then pressed into suitable bodies for shipment or sale and a film formed by certain of the liquid elements above referred to forms on the suface. This film prevents air from invading the mass and the density of the mass prevents various kinds of insects from attacking the mass. The product resulting from the different operations cannot be permeated by air and due to the natural preservative elements contained therein will be protected from deterioration for a long period.

The product therefore can be kept for an indefinite period of time without deteriorating in any way.

We have prepared dried fruits, such as apricots, prunes, peaches, pears, apples, and many forms of dried vegetables by the method herein set forth and have discovered that the products are free from deterioration for long periods of time.

Having thus described our improved food product and process of making the same, what we claim as new and wish to cover by a Letters Patent by the United States is as follows: modifications within the scope of the appended claim being expressly reserved.

The method of preserving fresh fruit, vegetables, and the like material, comprising first chopping the previously evaporated, sliced, fresh material to break up the tougher fibers, subjecting the same to a grinding action to reduce the fibers to minute form and produce a compact, thick mass in which the natural oils, fats, cellulose, starches, and mineral salts and the nutritive properties of the skin and pericarp are distributed, subjecting the mass to a second and finer grinding operation to further break up the cells, and finally pressing said mass into the desired shape.

In testimony whereof we have hereunto set our hands this 24th day of August A. D. 1924.

AUGUSTE GAY.
JAMES W. BOOTH.